United States Patent
Matsumoto et al.

[11] Patent Number: 6,055,041
[45] Date of Patent: Apr. 25, 2000

[54] DISTANCE MEASURING APPARATUS

[75] Inventors: Yukihiro Matsumoto, Kawaguchi; Osamu Harada, Kawasaki, both of Japan

[73] Assignee: Canon Kabushiki Kaisha, Tokyo, Japan

[21] Appl. No.: 09/067,010

[22] Filed: Apr. 27, 1998

[30] Foreign Application Priority Data

May 1, 1997 [JP] Japan ................................. 9-114017
Jul. 2, 1997 [JP] Japan ................................. 9-177275

[51] Int. Cl.[7] ............................ G01C 3/00; G03B 13/00; G03B 13/34
[52] U.S. Cl. ..................... 356/3.08; 396/106; 396/121
[58] Field of Search .................... 356/3.08–3.14, 356/3.15, 3.03; 396/96, 106–120, 121–125, 128, 147; 250/201.6, 201.7, 201.8

[56] References Cited

U.S. PATENT DOCUMENTS

| 4,655,586 | 4/1987 | Stauffer . | |
|---|---|---|---|
| 4,943,824 | 7/1990 | Nabeshima et al. . | |
| 4,947,202 | 8/1990 | Kitajima et al. . | |
| 5,848,305 | 12/1998 | Takasaki | 396/96 |
| 5,870,178 | 2/1999 | Egawa et al. | 356/3.03 |

*Primary Examiner*—Stephen C. Buczinski
*Attorney, Agent, or Firm*—Fitzpatrick, Cella, Harper & Scinto

[57] ABSTRACT

A distance measuring apparatus for a camera includes light-projecting means for projecting a light beam onto an object of distance measurement, and a pair of sensor arrays, each including a plurality of pixels located at respective pixel positions for receiving reflected light of the light beam reflected by the object of distance measurement and outputting a signal corresponding to the amount of reflected light received. The apparatus further includes phase difference detection means for detecting a phase difference between signals output from the pair of sensor arrays, distance measuring means for measuring a distance to the object on the basis of the phase difference, and shortest range discrimination means for discriminating whether the object of distance measurement is in a shortest range, on the basis of levels of maximum values of signals output by said pair of sensor arrays, where the shortest range is a distance or range at which photography can not be performed.

20 Claims, 7 Drawing Sheets

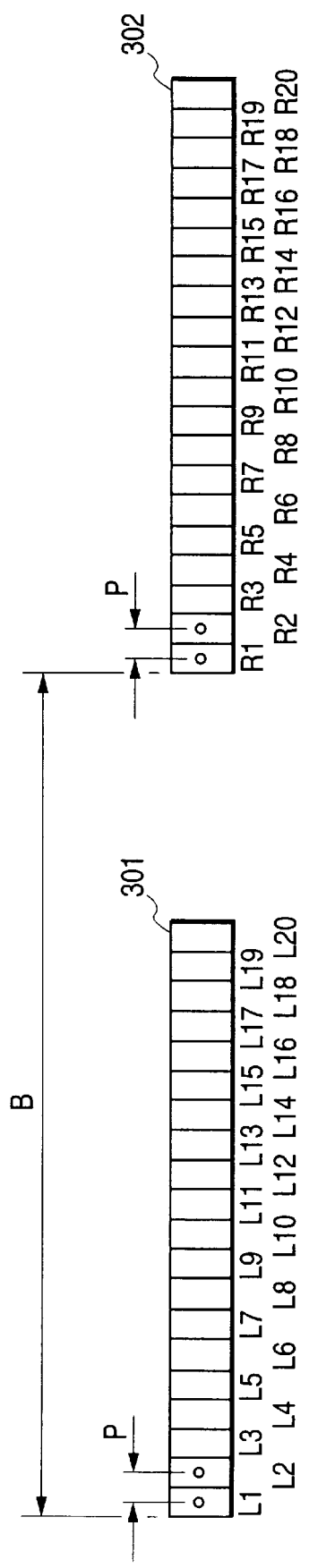

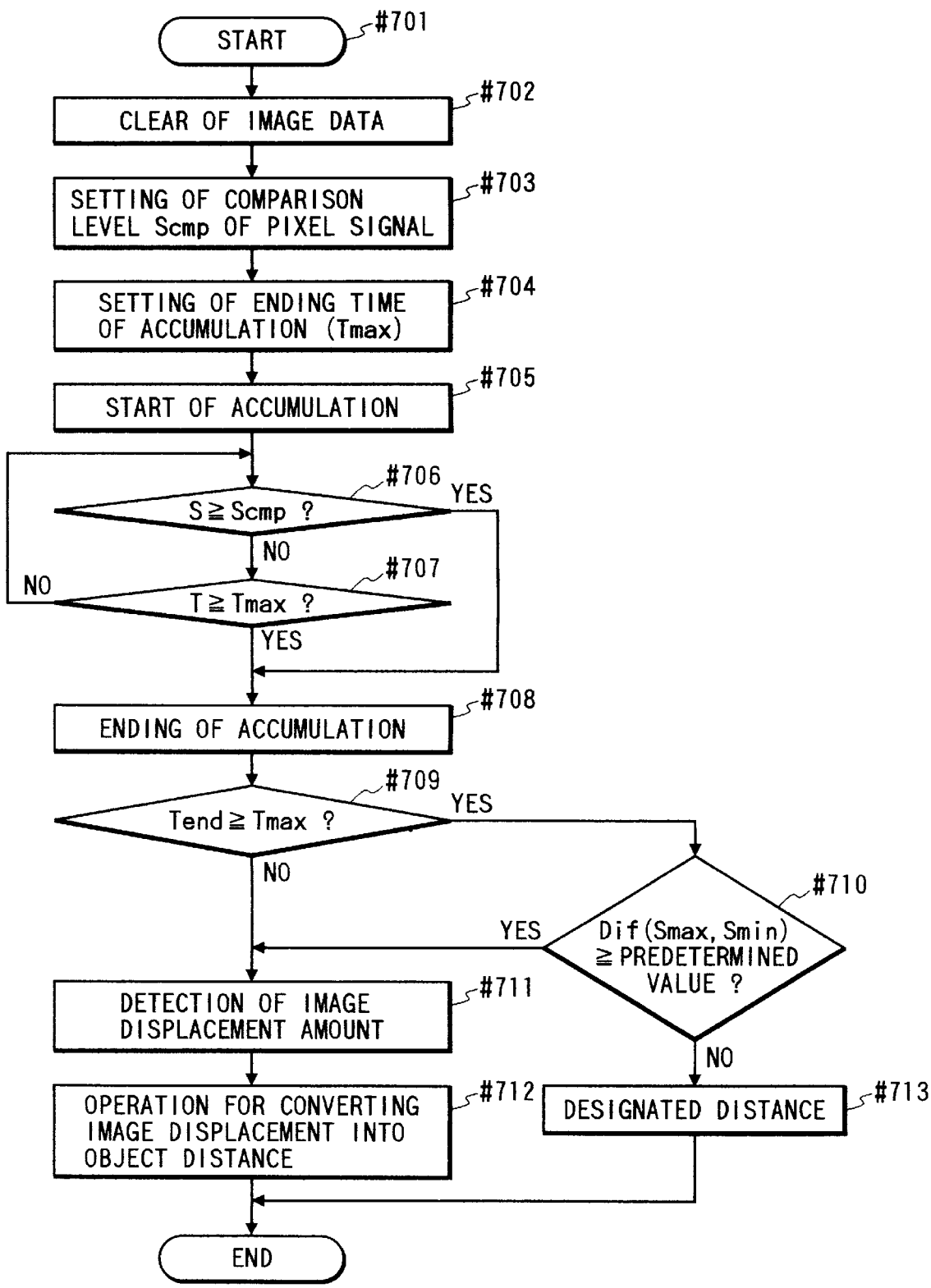

DISTANCE MEASURING APPARATUS

BACKGROUND OF THE INVENTION

1. Field of the Invention

The present invention relates to a distance measuring apparatus and method for a camera and, more particularly, to a shortest range discrimination unit of an active distance measuring apparatus incorporated into a compact camera.

2. Related Background Art

An active distance measuring apparatus calculates the distance to an object of distance measurement by receiving reflected light of projected light by using a semiconductor position detecting device (to be referred to as a PSD hereinafter) and detecting the position of the reflected light (the barycenter of the reflected light) on the PSD on the basis of the signal output from the PSD.

In the active apparatus as described above, errors occur when the distances of contrast objects are measured. Therefore, a pair of sensor arrays such as charge-coupled devices (to be referred to as CCDs hereinafter) are arranged in parallel as light-receiving devices to receive reflected light of projected light. The distance to an object of distance measurement is obtained by the phase difference between pieces of image information from these sensor arrays.

One example will be described below with reference to FIG. 3.

FIG. 3 is a view for explaining the principle of an active phase difference detection type distance measuring apparatus in which sensor arrays are arranged in parallel. Referring to FIG. 3, a pair of sensor arrays 301 and 302 are CCDs, i.e., a first CCD 301 and a second CCD 302.

Light-receiving lenses 303 and 304 are arranged in parallel and apart from each other by a fixed baseline length B. An infrared light-emitting device (to be referred to as an iRED hereinafter) 305 is a light-projecting unit. A light-projecting lens 306 projects light onto an object 307 of distance measurement.

In FIG. 3, the distance from the principal points of the light-receiving lenses 303 and 304 to the first and second CCDs 301 and 203 is denoted by f, the distance from the principal points of the light-receiving lenses 303 and 304 to the object 307 is denoted by H, the distance between the principal points of the light-receiving lenses 303 and 304 is denoted by B, and the distance between the principal points of the light-projecting lens 306 and the light-receiving lens 303 is denoted by K.

The value x1 is the amount that the received optical image is displaced (moving amount) from the central position of reflected light returned from the object 307 if it was located at infinity and focused by the light-receiving lens 303 to form an image on the first CCD 301 to the central position of reflected light returned from the object 307 located at the distance H and focused by the light-receiving lens 303 to form an image on the first CCD 301.

Likewise, the value x2 is the amount that the received optical image is displaced (moving amount) from the central position of reflected light returned from the object 307 if it was located at infinity and focused by the light-receiving lens 304 to form an image on the first CCD 302, to the central position of reflected light returned from the object 307 located at the distance H and focused by the light-receiving lens 304 to form an image on the first CCD 302. On the basis of these values, the following relation holds.

$$H = (B \times f)/(x2 - x1) \quad (1)$$

FIG. 4 explains the details of the first and second CCDs 301 and 302 in FIG. 3. Referring to FIG. 4, the first and second CCDs 301 and 302 are constituted by 20 pixels L1 to L20 and R1 to R20, respectively, and the pixel pitch is P. The distance from the left end of the pixel L1 to the left end of the pixel R1 is B which is equal to the distance between the light-receiving lenses 303 and 304.

Also, as shown in FIG. 4, predetermined continuous pixels are set as windows WL and WR in the first and second CCDS 301 and 302, respectively. (x2−x1) as the denominator on the right-hand side of equation (1) above is calculated by a method (by which one of the windows WL and WR is shifted bit by bit to obtain the correlation therebetween and the phase difference is calculated from the moving amount of the window at which this correlation takes the extreme) conventionally used in phase difference detection. In this manner the distance to the object 307 is obtained.

Recent compact cameras are being more and more downsized, and the distance measuring apparatuses are also being made more compact. This also shortens the sensor length of the first and second CCDs 301 and 302 described above. Consequently, at the shortest range (minimum distance) at which a camera cannot perform photographing, the received light spot of a light beam emitted from the light-projecting device 305 and reflected by the object 307 extends outside the sensor. This makes accurate discrimination of the shortest range impossible.

FIGS. 5A to 5D show the positional relationships between the first and second CCDS 301 and 302 and the received light spot when the object 307 is at different distances, and a pair of pieces of image information from the first and second CCDs 301 and 302 after analog-to-digital (A/D) conversion.

In FIG. 5A, the object is at a normal distance at which photographing is possible, and received light spots 1a and 2a are on the sensors of the first and second CCDs 301 and 302, respectively. Therefore, the coincidence of the pair of pieces of image information is high, so a reliable distance measurement result can be obtained.

In FIG. 5E, the object 307 is in the vicinity of the photographing limit on the short distance side. Accordingly, although a received light spot 1e is on the sensor of the first CCD 301, a received light spot 2e partially extends outside the sensor of the second CCD 302. Consequently, the coincidence of the pair of pieces of image information is lower than that in FIG. 5A. However, a distance measurement result having reliability to a certain degree can be obtained.

In FIGS. 5B and 5C, the object 307 is at the shortest range at which no photographing is possible. In these cases, most of the received light spot incident on the second CCD 302 extends outside the sensor of the second CCD 302, and this lowers the coincidence of the pair of pieces of image information. Consequently, only distance measurement results with low reliability can be obtained. Therefore, the shortest range cannot be easily discriminated from the results of the phase difference detection.

In the distance measuring apparatus as shown in FIG. 3, when the distance to the object 307 is shortened, only the received light spot on the sensor of the second CCD 302 extends outside it. This is so because, as indicated by equation (2) and equation (3) below, the moving amount x2 of the received light image on the second CCD 302 is larger than the moving amount x1 of the received light image on the first CCD 301.

$$x1 = (K \times f)/H \quad (2)$$

$$x2 = ((K+B) \times f)/H \quad (3)$$

SUMMARY OF THE INVENTION

The present invention has been made in consideration of the above situation, and has as its object to accurately inform a user of the impossibility of photographing when the distance to an object of distance measurement is the shortest range at which no photographing is possible.

It is another object of the present invention to reduce the release time lag while maintaining the distance measurement accuracy by using a distance measuring method by which when the signal level of an image signal accumulated in a light-receiving sensor within a predetermined time exceeds a previously set value and the charge accumulation in the light-receiving sensor is complete, it is determined that the signal level difference of the image signal is sufficiently large and no contrast determination is performed, and, only when the light-receiving device cannot obtain an image signal having a sufficiently high signal level, contrast determination is performed to check the difference between the maximum and minimum signal levels of an image signal.

According to one aspect of the present invention, there is provided a distance measuring apparatus of a camera, comprising light-projecting means for projecting a light beam onto an object of distance measurement, a pair of sensor arrays for receiving reflected light of the light beam reflected by the object, A/D conversion means for A/D-converting a pair of pieces of image information output from the sensor arrays, storage means for storing the pair of pieces of image information converted into a digital signal by the A/D conversion means, phase difference detection means for detecting a phase difference between the pair of pieces of image information stored in the storage means, distance measuring means for measuring a distance to the object on the basis of the phase difference, and shortest range discrimination means for discriminating whether the object is at a shortest range at which camera photographing is impossible, on the basis of levels of maximum values of the pair of pieces of image information and pixel positions in the sensor arrays where the maximum values are detected.

According to another aspect of the present invention, there is provided a distance measuring apparatus for a camera, comprising charge accumulation means for photographing an object image, accumulating photographing electric charge in a pair of first and second sensor arrays, and generating a pair of pieces of image information, A/D conversion means for converting the pair of pieces of image information into a digital signal, storage means for storing the pair of pieces of image information converted into the digital signal, maximum value detection means for detecting a maximum value of the second sensor array from the image information stored in the storage means, maximum value determination means for determining whether the maximum value detected by the maximum value detection means is larger than previously set first and second predetermined values, and phase difference detection means for performing phase difference detection using the pair of pieces of image information if the maximum value determination means determines that the maximum value is larger than the second predetermined value.

A distance measuring method for a camera according to the present invention comprises charge accumulation processing or photographing an object image, accumulating photographing electric charge in a pair of first and second sensor arrays, and generating a pair of pieces of image information, A/D conversion processing or converting the pair of pieces of image information into a digital signal, storage processing on storing the pair of pieces of image information converted into the digital signal in storage means, maximum value detection processing or detecting a maximum value of the second sensor array from the image information stored in the storage means, maximum value determination processing or determining whether the maximum value detected in the value detection processing is larger than previously set first and second predetermined values, and phase difference detection processing or performing phase difference detection using the pair of pieces of image information when the maximum value determination processing determines that the maximum value is larger than the second predetermined value.

The above method of the present invention further comprises pixel position detection processing or detecting a pixel position on the second sensor array where the maximum value is detected if the maximum value is smaller than the previously set second predetermined value, wherein if the pixel position detected in the pixel position detection processing is an endmost pixel on a near side of the second sensor array, it is determined that the object is in a shortest range at which camera photographing is impossible, and photographing is ended, and if the pixel position is not the endmost pixel on the near side of the second sensor array, then phase difference detection using the pair of pieces of image information is performed.

According to the above-described apparatus and method of the present invention, the maximum values of the pair of pieces of image information and pixel positions on the sensor arrays where the maximum values exist are detected before the phase difference detection is performed. On the basis of these detection values, it is determined whether the distance to the object is within the shortest range at which no camera photographing can be performed. Therefore, even if the coincidence of the pair of pieces of image information is low, the discrimination of the shortest range can be accurately performed.

To achieve the above object, according to the present invention, there is provided a distance measuring apparatus for accumulating electric charge by photoelectrically converting incident light from an object using a pair of light-receiving sensors, outputting the accumulated charge as an image signal, completing the charge accumulation if a signal level of the output image signal is not less than a predetermined value, and calculating a distance to the object on the basis of the output image signal. The apparatus comprises arithmetic operation means for performing a predetermined arithmetic operation on the basis of the output image signal from the pair of light-receiving sensors, and control means for omitting the arithmetic operation by the arithmetic operation means if a time required for the charge accumulation is less than a predetermined time.

Also, according to the present invention, there is provided a distance measuring method of accumulating electric charge by photoelectrically converting incident light from an object using a pair of light-receiving sensors, outputting the accumulated charge as an image signal, completing the charge accumulation if a signal level of the output image signal is not less than a predetermined value, and calculating a distance to the object on the basis of the output image signal. The method comprises a step of performing a predetermined arithmetic operation on the basis of the output image signal if a time required for the charge accumulation is not less than a predetermined time, and a step of calculating the distance to the object on the basis of the output image signal without performing the predetermined arithmetic operation if the time required for the charge accumulation is less than the predetermined time.

In the above method, the predetermined arithmetic operation is an arithmetic operation for determining contrast of the image signal and, more specifically, an arithmetic operation for calculating a difference between a maximum signal level and a minimum signal level of the image signal.

According to the above-described distance measuring apparatus and method of the present invention if the charge accumulation in the light-receiving sensor is complete because the signal level of an image signal accumulated in the sensor exceeds a previously set value within a predetermined time, it is determined that the signal level difference of the image signal is sufficiently high, and no contrast determination is performed. Contrast determination for checking the difference between the maximum and minimum signal levels of an image signal is performed only when the light-receiving device cannot obtain an image signal having a sufficiently high signal level. Consequently, the release time lag can be shortened while the distance measurement accuracy is maintained.

Other features and advantages of the invention will become apparent from the following detailed description taken in conjunction with the accompanying drawings.

BRIEF DESCRIPTION OF THE DRAWINGS

FIG. 4 is a view for explaining the arrangement of the sensors of the CCDs;

FIG. 7 is a flow chart for explaining the distance measurement operation of the second embodiment.

DETAILED DESCRIPTION OF THE PREFERRED EMBODIMENTS

Figure 1:
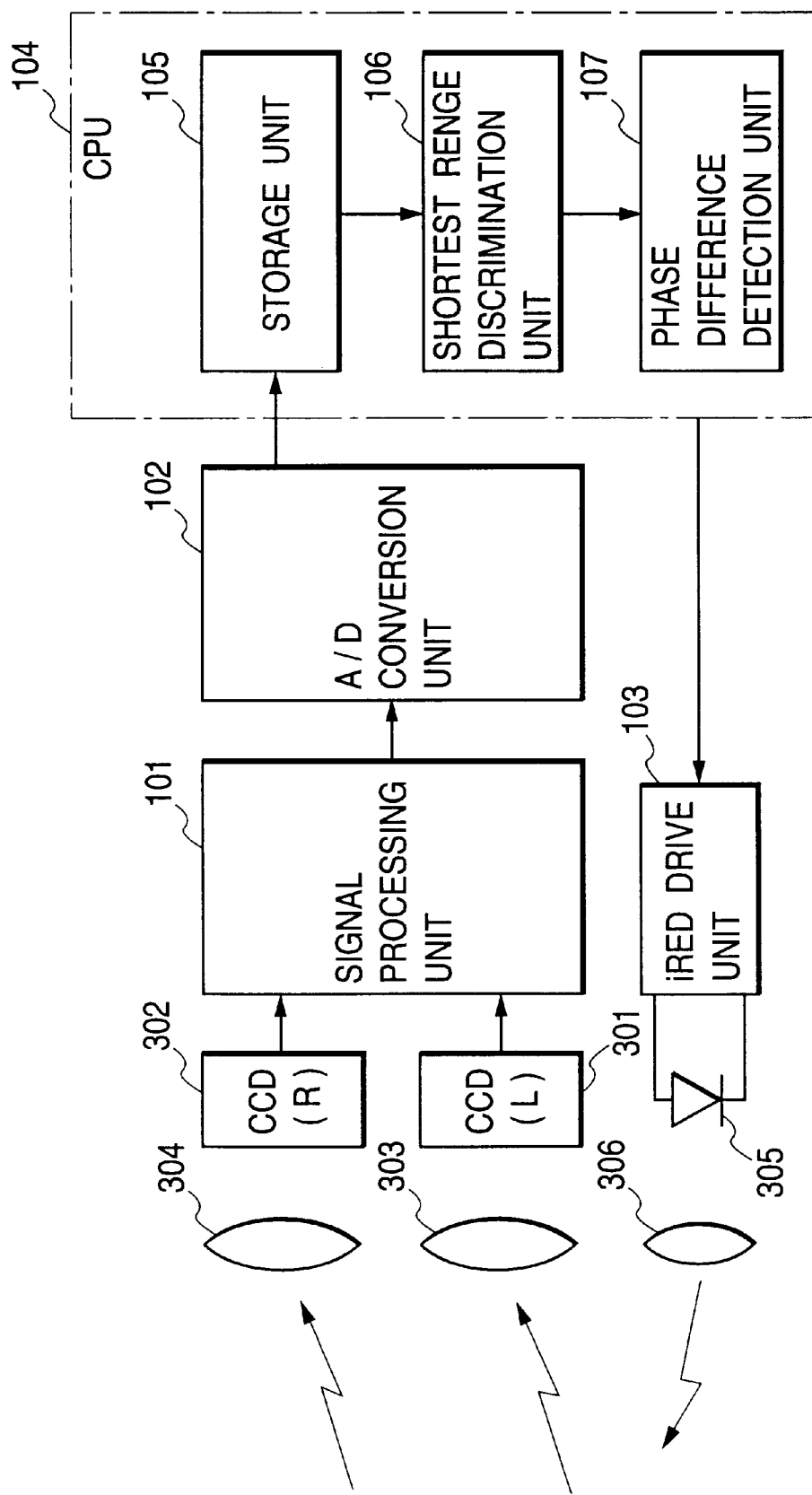
FIG. 1 is a block diagram showing the arrangement of a distance measuring apparatus according to the first embodiment of the present invention.
Figure 3:
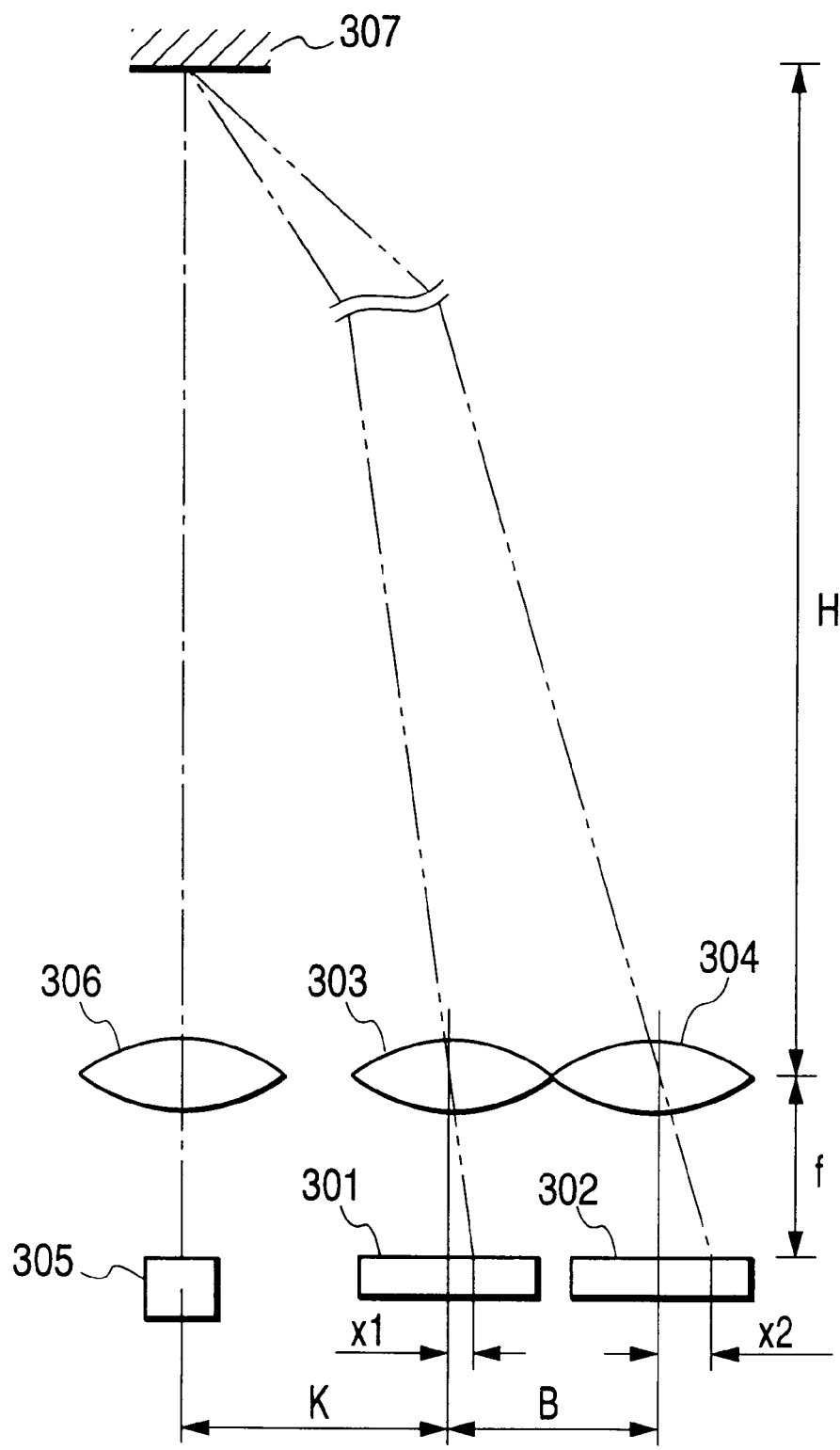
FIG. 3 is a view for explaining the principle of distance measurement of an active phase difference detection type distance measuring apparatus in which CCDs are arranged in parallel.

FIG. 1 is a block diagram showing the arrangement of a distance measuring apparatus according to the first embodiment of the present invention. This distance measuring apparatus uses a distance measurement system shown in FIG. 3. Since this distance measurement system is explained in detail in the description of "Related Background Art", a detailed description thereof will be omitted.

Referring to FIG. 1, a signal processing unit 101 removes external light components from output image information from first and second CCDs 301 and 302 and amplifies the signal.

An A/D conversion unit 102 A/D-converts the output image information from the signal processing unit 101. An iRED drive unit 103 turns on an iRED 305 under the control of a CPU 104.

The CPU 104 controls individual units including the iRED drive unit 103 as described above and also performs various arithmetic operations.

A storage unit 105 stores a pair of pieces of image information converted into a digital signal by the A/D conversion unit 102.

A shortest range discrimination unit 106 discriminates whether an object of distance measurement is at the shortest range at which camera photographing is impossible, on the basis of the maximum values of the pair of pieces of image information stored in the storage unit 105 and the pixel positions of the first and second CCDs 301 and 203 where the maximum values are present.

A phase difference detection unit 107 calculates the correlation from the pair of pieces of image information stored in the storage unit 105 and thereby calculates the phase difference between the two images. The storage unit 105, the shortest range discrimination unit 106, and the phase difference detection unit 107 are constituted by programs by the CPU 104.

The distance measurement operation by the distance measuring apparatus shown in FIG. 1 will be described below with reference to the flow chart in FIG. 2.

Figure 2:
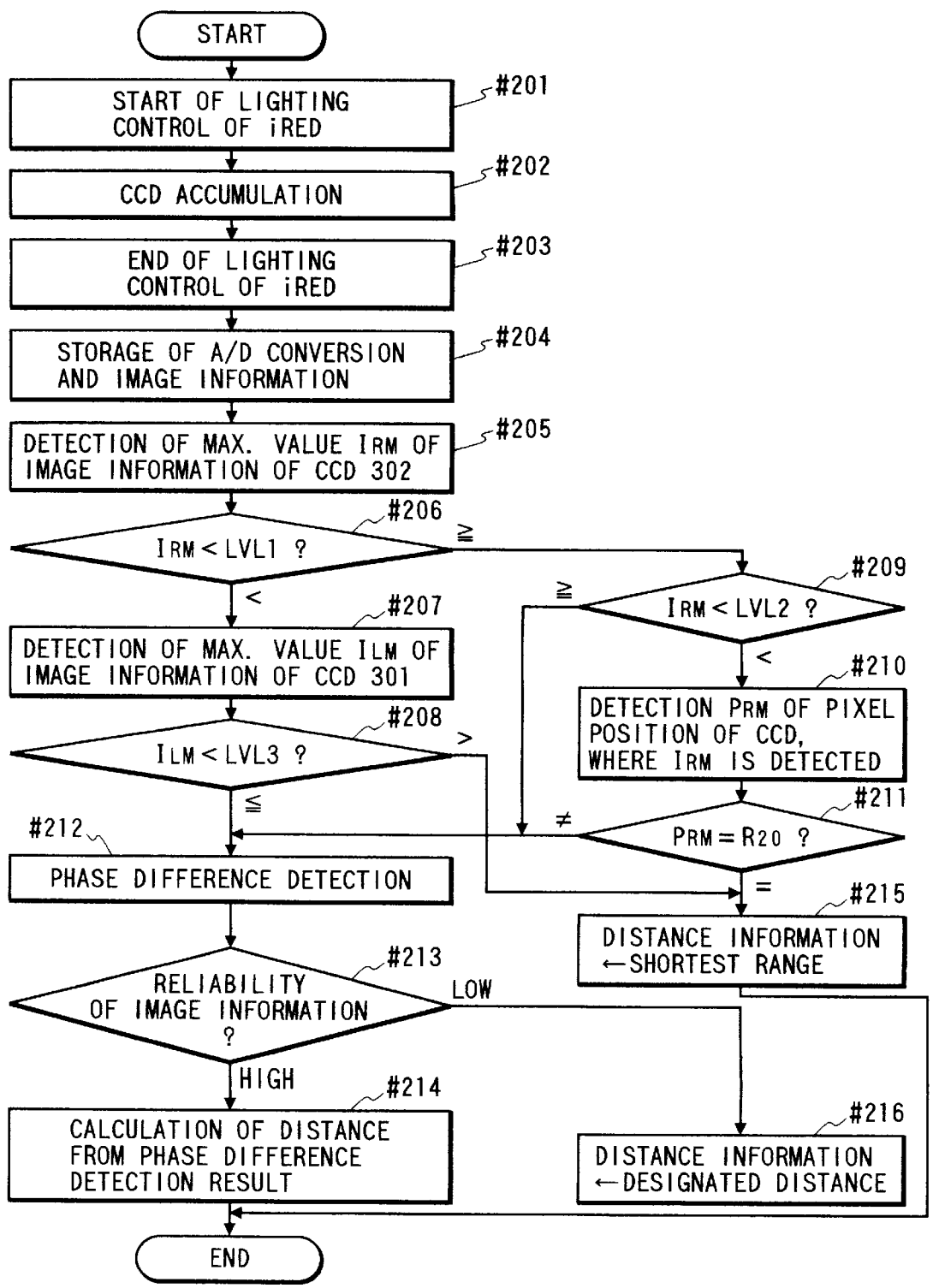
FIG. 2 is a flow chart for explaining the operation of the first embodiment.

Referring to FIG. 2, in step #201, the iRED 305 is turned on by pulses. In step #202, electric charge is accumulated in the first and second CCDs 301 and 302 for a predetermined time. In step #203, the iRED 305 is turned off.

In step #204, the signal processing unit 101 removes external light components and amplifies the signal to a predetermined level. The pair of pieces of image information thus amplified are A/D-converted and stored in the storage unit 105.

In step #205, a maximum value $I_{RM}$ of the second CCD 302 is detected from the image information stored in the storage unit 105.

In step #206, whether the detected maximum value $I_{RM}$ is smaller than a first predetermined value LVL1 is checked. If the maximum value $I_{RM}$ is equal to or larger than the first predetermined value LVL1, the flow advances to step #209.

This first predetermined value LVL1 is a first comparative value to be compared with the maximum value $I_{RM}$ of the image information from the second CCD 302 and is obtained from an experimental value. The distance measurement condition under which the flow advances to step #209 is that at least a portion of the received light spot is present on the sensor of the second CCD 302.

Figures 5A, 5B, 5C, 5D, 5E:
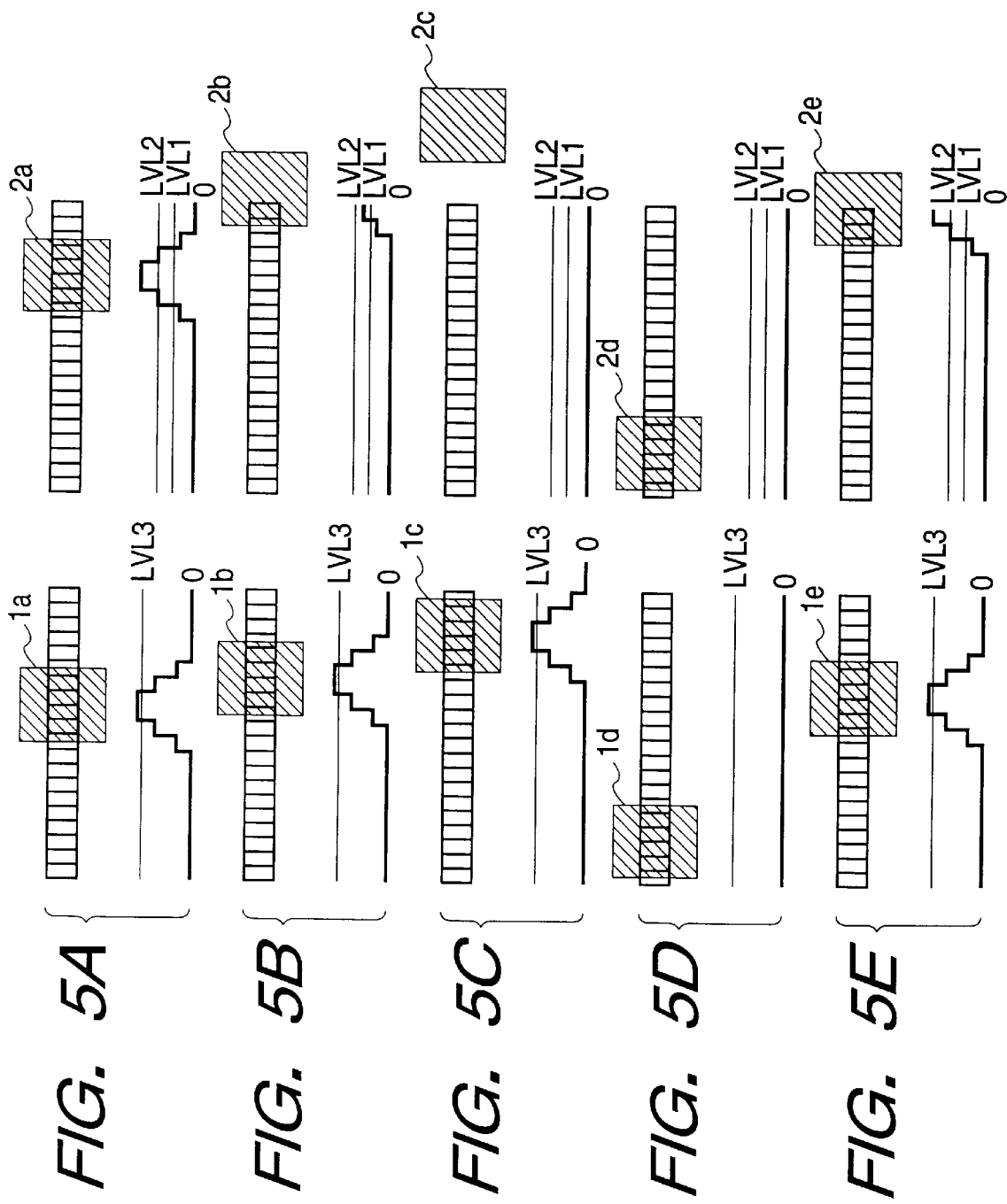
FIGS. 5A, 5B, 5C, 5D and 5E are views showing the relationship between the received light spot position on the CCD and the signal output from the CCD.

In step #209, whether the maximum value $I_{RM}$ of the second CCD 302 is smaller than a second predetermined value LVL2 is checked. If the maximum value $I_{RM}$ is equal to or larger than the second predetermined value LVL2, the signal output from the second CCD 302 has a sufficiently high level. In a situation like this, the object is at a normal distance at which photographing is possible, or only a portion of a received light spot 2e extends outside the sensor of the second CCD 302 as shown in FIG. 5E.

Accordingly, the pair of pieces of image information output from the first and second CCDs 301 and 302 have a certain degree of coincidence, and it is highly likely that a reliable distance measurement result is obtained. Therefore, the flow advances to step #212 to perform phase difference detection using the pair of pieces of image information.

This second predetermined value LVL2 is a second comparative value to be compared with the maximum value $I_{RM}$ of the image information from the second CCD 302. The second predetermined value LVL2 and the first predetermined value LVL1 described above have a relation LVL1<LVL2. The set value of the second predetermined value LVL2 is obtained from an experimental value set so as to be smaller than the maximum value of the image information from the second CCD 302 when distance measurement is performed at a normal photographing distance.

On the other hand, if it is determined in step #209 that the maximum value $I_{RM}$ of the image information from the second CCD 302 is smaller than the second predetermined value LVL2, the flow advances to step #210 to detect a pixel position on the second CCD 302 where the maximum value $I_{RM}$ of the image information from the second CCD 302 is present.

Assume that the pixel position detected in step #210 is $P_{RM}$. If it is determined in the pixel position detection in step #211 that the pixel position $P_{RM}$ is an endmost pixel R20 on the near side of the second CCD 302, most of a received light spot 2b as the image output from the second CCD 302 extends outside the sensor surface of the second CCD 302 as shown in FIG. 5B.

In a case like this, therefore, it is determined that the distance to the object is the shortest range, i.e., a short range at which no camera photographing is possible, and the flow advances to step #215. In step #215, the distance measurement operation is completed by setting the shortest range as the distance information, and an alarm display is performed by a display unit (not shown) to inform the user of the distance measurement result.

If it is determined in step #211 that the pixel position $P_{RM}$ is not the endmost pixel R20 on the near side of the second CCD 302, although the image information from the second CCD 302 is small, it is highly possible that the object is at a distance at which the camera can perform photographing. Therefore, the flow advances to step #212 to perform phase difference detection.

If it is determined in step #206 that the maximum value $I_{RM}$ of the image information from the second CCD 302 is smaller than the first predetermined value LVL1, the received light image completely extends outside the sensor of the second CCD 302 and there is no image information as shown in FIG. 5C. Alternatively, as shown in FIG. 5D, the object to be photographed may be at a long distance, so no signal output can be obtained although received light spots 1d and 2d are present on the sensors of the first and second CCDs 301 and 302.

The difference between FIGS. 5C and 5D is the presence/absence of the image information from the first CCD 301. Therefore, in step #207 a maximum value $I_{LM}$ of the image information from the first CCD 301 is detected on the basis of the image information stored in the storage unit 105.

In step #208, whether the maximum value $I_{LM}$ thus detected is smaller than a third predetermined comparative value LVL3 is checked. If it is determined in step #208 that the detected maximum value $I_{LM}$ is smaller than the third comparative value LVL3, the pieces of image information from the CCDs are as shown in FIG. 5D, i.e., the object is at a long distance. Therefore, the flow advances to step #212 to perform phase difference detection.

If it is determined in step #208 that the detected maximum value $I_{LM}$ is equal to or larger than the third predetermined value LVL3, the image information from the first CCD 301 is sufficiently large, and the image information from the CCDs are as shown in FIG. 5C. If this is the case, it is determined that the object is at the shortest range, i.e., a short range at which camera photographing is impossible. Therefore, the flow advances to step #215 to set the shortest range as the distance information and complete the distance measurement operation. The processing in each of steps #205 to #211 is done by the shortest range discrimination unit 106 shown in FIG. 1.

If it is not determined in each processing that the object is at the shortest range, i.e., a short range at which cameral photographing is impossible, then phase difference detection is performed in step #212 by using the image information from the first and second CCDs 301 and 302 stored in the storage unit 105.

In step #213, the reliability of the image information is checked by calculating the contrast amount of the image information and the coincidence of the pair of pieces of image information. If it is determined that the reliability is high, the flow advances to step #214 to calculate the distance to the object from the phase difference detected in step #212, thereby completing the distance measurement operation.

On the other hand, if it is determined in step #213 that the reliability is low, distance measurement NG is set, and the flow advances to step #216. In step #216, a previously set designated distance is set as the photographing distance information to complete the distance measurement operation.

In the first embodiment of the present invention as described above, the maximum value of each of the pair of pieces of image information and a pixel position on the sensor array where this maximum value exists are detected. On the basis of these detected values, whether the distance to an object of distance measurement is the shortest range, i.e., a short range at which camera photographing cannot be performed is checked. Therefore, even when the coincidence of the pair of pieces of image information is low, the shortest range can be accurately discriminated. Accordingly, even if the coincidence of the pair of pieces of image information is lowered because one received light spot extends outside the sensor of the corresponding CCD when an object of distance measurement is at the shortest range, i.e., a short range at which camera photographing is impossible, it is possible to readily discriminate that the object is at the shortest range. This meets demands on downsizing of distance measuring apparatuses in compact cameras and the like.

Figure 6:
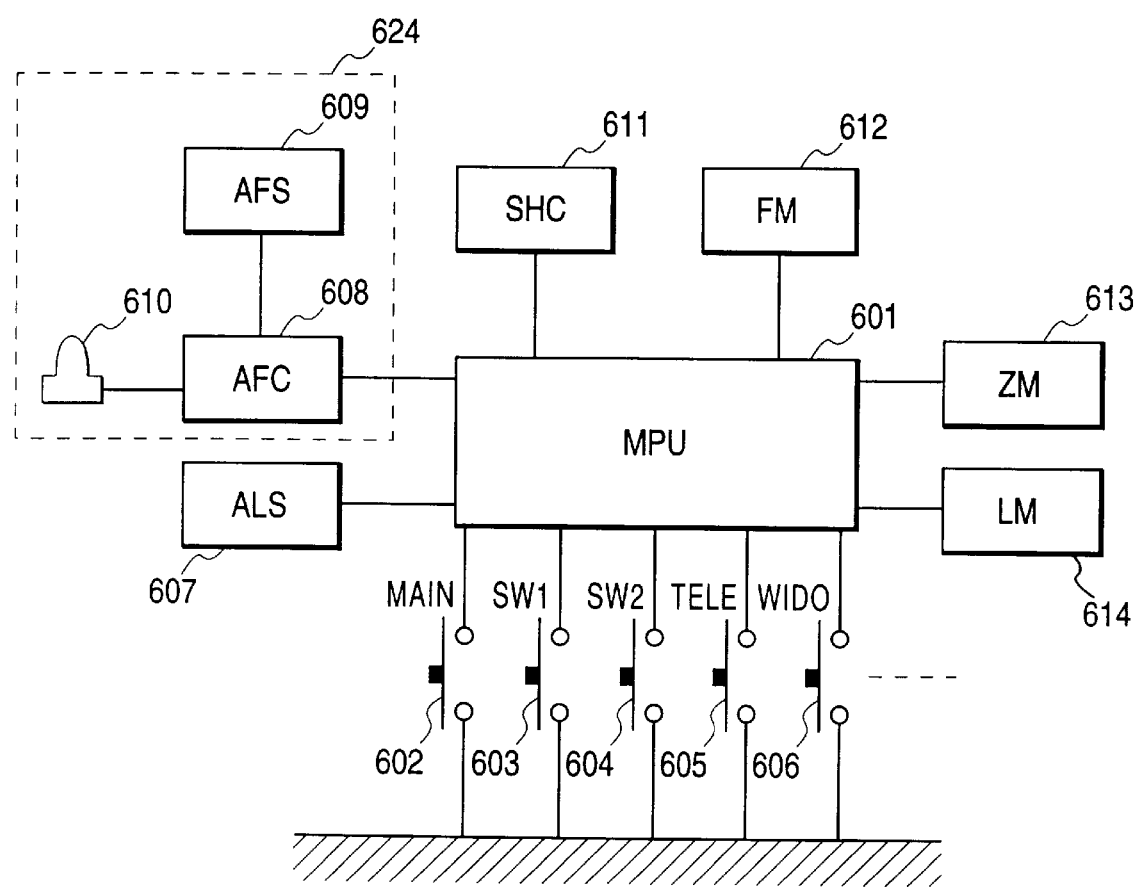
FIG. 6 is a block diagram of a camera system using a distance measuring apparatus according to the second embodiment of the present invention.

FIG. 6 is a block diagram of a camera system using a distance measuring apparatus according to the second embodiment of the present invention.

Referring to FIG. 6, a microprocessor (MPU) 601 includes an A/D converter, an arithmetic circuit, and a storage unit (none of them is shown). A power switch (MAIN) 602 is used to turn on/off the power supply of the camera. A switch (SW1) 603 starts a release operation. When the switch 603 is closed, distance measurement or photometry is performed. When a switch (SW2) 604 is closed while the switch 603 is closed, film exposure or the like is performed.

A zoom switch (TELE) 605 switches the focal length of the camera to the telephoto side. A zoom switch (WIDE) 606 switches the focal length of the camera to the wide angle side. A photometric sensor (ALS) 607 measures the brightness of an object. An exposure time is calculated on the basis of the brightness measured by this sensor.

A distance measuring unit 624 includes a distance measuring sensor (AFS) 609, a light-emitting device 610 such as an iRED, and a distance measuring device controller (AFC) 608. The emission time and emission timing of the light-emitting device 610 are controlled by the distance measuring device controller 608. Also, the distance measuring sensor 609 comprises a pair of line sensors, although not shown in FIG. 6.

A shutter controller (SHC) 611 opens a shutter (not shown) for a predetermined time to expose a film (not shown). A feed driver (FM) 612 winds a predetermined amount of the exposed film (not shown). A lens barrel driver (ZM) 613 drives a lens barrel (not shown) in order to change the focal length of the camera. A focus driver (LM) 614 controls a focus-adjusting lens (not shown) on the basis of object distance information obtained from the distance measuring unit 624.

FIG. 7 is a flow chart showing the distance measurement operation in the second embodiment.

When the switch (SW1) 603 of the camera is closed, distance measurement processing is started in step #701. In step #702, electric charge remaining in a light-receiving sensor and its peripheral circuit is cleared.

In step #703, a comparison level Scmp as a threshold value of the signal level of an image signal accumulated in line sensors 301 and 302 is set. If the signal level of an image signal received by the light-receiving sensor exceeds this comparison level Scmp, the charge accumulation in the line sensors 301 and 302 is stopped. In order that the maximum signal level of an image signal obtained as a charge accumulation result be an appropriate one to detect the displacement amount of an object image (to be described later), any arbitrary value is set as the comparison level Scmp as long as the line sensors 301 and 302 do not saturate.

In step #704, the longest time (Tmax) for which the image signal charge accumulation is continued in the line sensors 301 and 302 is set. That is, if no image signal larger than the comparison level Scmp set in step #703 can be obtained, the image signal charge accumulation is stopped when the time Tmax set in step #704 has elapsed.

In step #705, the image signal charge accumulation is started. In step #706, whether the signal level of an image signal S is not less than the comparison level Scmp set in step #703 is checked. If the signal level is equal to or more than the comparison level Scmp, it is determined that an image signal having a enough signal level sufficient to calculate a distance measurement value (the displacement amount of an object image) is obtained, and the flow advances to step #708. If the signal level does not exceed the comparison level Scmp, it is determined that an image signal having a sufficient signal level is not obtained, and the charge accumulation is continued.

If it is determined in step #706 that the signal level of the image signal S is lower than the comparison level Scmp, the flow advances to step #707 to check whether a time T which has elapsed since the charge accumulation was started in step #705 is less than the time Tmax set in step #704. If the time T is less than the time Tmax, the accumulation operation is continued, and the flow returns to step #706. If the elapsed time T exceeds the time Tmax, the flow advances to step #708 to complete the accumulation operation even if an image signal having a sufficient signal level to calculate the displacement amount (distance measurement value) of an object image has not been accumulated.

After the image signal charge accumulation is complete in step #708, the flow advances to step #709 to check whether a time Tend required for the charge accumulation is equal to or more than the time Tmax set in step #704, i.e., whether the charge accumulation is stopped because the time Tmax elapsed or complete because a sufficient image signal charge is accumulated. If Tend$\geq$Tmax, i.e., if the time is up, the flow advances to step #710. If Tend<Tmax, the flow advances to step #711 because an image signal having a sufficient signal level is accumulated.

On the other hand, an image signal obtained when the charge accumulation is stopped because the time Tmax elapsed is a signal of a relatively dark image whose maximum signal level is lower than the comparison level Scmp. Therefore, the contrast of the image, i.e., the difference in brightness in the image can be small. If the contrast is low, it is difficult to calculate the displacement amount (distance measurement value) of an object image. Therefore, in step #710, contrast determination is performed for the obtained image signal, i.e., whether the difference (Dif(Smax,Smin)) between a maximum signal level Smax and a minimum signal level Smin is equal to or more than a predetermined value is checked. If it is determined that the signal level difference is smaller than the predetermined value, i.e., the contrast is low, the flow advances to step #713 to output designated distance data as the distance measurement result and complete the distance measurement operation. If it is determined that the signal level difference is equal to or more than the predetermined value, i.e., the contrast is high enough to calculate the displacement amount of an object image, the flow advances to step #711.

In step #711, the displacement amount of object image signals of two images is calculated. In step #712, the distance to the object is calculated on the basis of the displacement amount, and the distance measurement operation is complete.

In the present invention, a pair of line sensors using CCDs are used as light-receiving devices. However, it is also possible to use a pair of arrays in which a plurality of silicon photodiodes (SPDs) or skim CCDs are arranged. Light-receiving devices can also be formed by arranging area sensors, instead of line sensors, in the same plane.

The present invention can be applied to a system constituted by a plurality of devices (e.g., a host computer and a camera head) or to an apparatus (e.g., a camera) comprising a single device.

Further, the object of the present invention can also be achieved by providing a storage medium storing program codes for performing the aforesaid functions according to the embodiments to a system or an apparatus, reading the program codes with a computer (e.g., CPU or MPU) of the system or apparatus from the storage medium, and then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for supplying the program codes.

Furthermore, besides the aforesaid functions according to the above embodiments which are realized by executing program codes which are read by a computer, the present invention includes a case where an OS (Operating System) or the like working on the computer performs a part or the entire process in accordance with designations of the program codes and realizes functions according to the above embodiments.

Furthermore, the present invention also includes a case where, after the program codes read from the storage medium are written in a function extension board which is inserted into the computer or in a memory provided in a function extension unit which is connected to the computer, a CPU or the like contained in the function extension board or unit performs a part or the entire process in accordance with designations of the program codes and realizes functions of the above embodiments.

According to the embodiment of the present invention described above, if the charge accumulation operation in the light-receiving sensor is completed during distance measurement because the signal level of an image signal accumulated in the sensor exceeds a previously set value within a predetermined time, it is determined that the signal level difference of the image signal is sufficiently high, and no contrast determination is performed. Contrast determination for checking the difference between the maximum and minimum signal levels of an image signal is performed only when the light-receiving device cannot obtain an image signal having a sufficient signal level. Consequently, the release time lag can be shortened while the distance measurement accuracy is maintained.

Many widely different embodiments of the present invention may be constructed without departing from the spirit and scope of the present invention. It should be understood that the present invention is not limited to the specific embodiments described in the specification, except as defined in the appended claims.

What is claimed is:

1. A distance measuring apparatus for a camera comprising:
   light-projecting means for projecting a light beam onto an object of distance measurement;
   a pair of sensor arrays, each including a plurality of pixels located at respective pixel positions for receiving reflected light of the light beam reflected by the object of distance measurement and outputting a signal corresponding to the amount of reflected light received;
   phase difference detection means for detecting a phase difference between signals output from the pair of sensor arrays;
   distance measuring means for measuring a distance to the object on the basis of the phase difference; and
   shortest range discrimination means for discriminating whether the object of distance measurement is in a shortest range, on the basis of levels of maximum values of signals output by said pair of sensor arrays.

2. A distance measuring apparatus, comprising:
   charge accumulation means for generating an object image by accumulating electric charge in a pair of first and second sensor arrays, and generating a signal including a pair of pieces of image information;
   maximum value detection means for detecting a maximum value of signals output from said second sensor array
   maximum value determination means for determining whether the maximum value detected by said maximum value detection means is larger than previously set first and second predetermined values;
   phase difference detection means for performing phase difference detection using the pair of pieces of image information; and
   shortest range discrimination means for determining whether the object of distance measurement is in a shortest range, on the basis of a pixel position in the second sensor array where the maximum value is detetected, provided that the maximum value is larger than the first predetermined value, and less than the second predetermined value.

3. A distance measuring method, comprising:
   a charge accumulation step of generating an object image by accumulating electric charge in a pair of first and second sensor arrays, and generating signals including a pair of pieces of image information;
   a maximum value detection step of detecting a maximum value of signals output from said second sensor array
   a maximum value determination step of determining whether the maximum value detected in the value detection step is larger than previously set first and second predetermined values;
   a phase difference detection step of performing phase difference detection using the pair of pieces of image information; and
   a shortest range discrimination step of determining whether the object of distance measurement is in a shortest range, on the basis of a pixel position in the second sensor array where the maximum value is detected, provided that the maximum value is larger than the first predetermined value, and less than the second predetermined value.

4. A method according to claim 3, wherein said shortest range discrimination step determines that the object is in the shortest range when the pixel position is at an edge of the second sensor array.

5. A distance measuring apparatus, comprising:
   a pair of light-receiving sensors for accumulating electric charge by photoelectrically converting incident light from an object, and outputting the accumulated charge as an image signal;
   means for terminating charge accumulation if a signal level of the output image signal is not less than a predetermined value, or if a predetermined time of charge accumulation has passed;
   calculating means for calculating a distance to the object on the basis of the output image signal;
   arithmetic operation means for performing a predetermined arithmetic operation on the basis of the output image signal from said pair of light-receiving sensors; and
   control means for omitting the arithmetic operation by said arithmetic operation means if a charge accumulation time is less than said predetermined time.

6. An apparatus according to claim 5, wherein the predetermined arithmetic operation is an arithmetic operation for determining contrast of the image signal.

7. An apparatus according to claim 6, wherein the predetermined arithmetic operation is an arithmetic operation for calculating a difference between a maximum signal level and a minimum signal level of the image signal.

8. An apparatus according to claim 5, wherein said pair of sensors are line sensors.

9. An apparatus according to claim 8, wherein said line sensors are arranged in a straight line.

10. An apparatus according to claim 5, wherein said pair of sensors are area sensors.

11. An apparatus according to claim 10, wherein said area sensors are arranged in the same plane.

12. An apparatus according to claim 5, wherein said pair of sensors comprise CCDs.

13. An apparatus according to claim 5, wherein said pair of sensors comprise silicon photodiodes.

14. An apparatus according to claim 5, wherein said pair of sensors comprise skim CCDs.

15. A distance measuring method comprising the steps of:
    accumulating electric charge by photoelectrically converting incident light from an object using a pair of light-receiving sensors,
    outputting the accumulated charge as an image signal,
    terminating charge accumulation if a signal level of the output image signal is not less than a predetermined value, or a predetermined time has passed, and calculating a distance to the object on the basis of the output image signal, wherein if a charge accumulation time is not less than the predetermined time, a predetermined arithmetic operation is performed on the basis of the output image signal, and, if the charge accumulation time is less than the predetermined time, the distance to the object is calculated on the basis of the output image signal without performing the predetermined arithmetic operation.

16. A method according to claim 15, wherein the predetermined arithmetic operation is an arithmetic operation for determining contrast of the image signal.

17. A method according to claim 16, wherein the predetermined arithmetic operation is an arithmetic operation for calculating a difference between a maximum signal level and a minimum signal level of the image signal.

18. An apparatus according to claim 1, wherein said shortest range discrimination means determines whether the object is in the shortest range based on the pixel position in the sensor array where the maximum value is detected.

19. An apparatus according to claim 1, wherein, when maximum value is within a predetermined range, said shortest range discrimination means discriminates whether the object is in the shortest range based on the pixel position in the sensor array where the maximum value is detected.

20. An apparatus according to claim 2, wherein said shortest range discrimination means determines that the object of distance measurement is in the shortest range when the pixel position of a position is at the edge of the second sensor array.

* * * * *

UNITED STATES PATENT AND TRADEMARK OFFICE
CERTIFICATE OF CORRECTION

PATENT NO. : 6,055,041
DATED : April 25, 2000
INVENTOR(S) : YUKIHIRO MATSUMOTO, ET AL.

It is certified that error appears in the above-identified patent and that said Letters Patent is hereby corrected as shown below:

Sheet 1

Figure 1, "RENGE" should read --RANGE--.

Column 8

Line 2, "cameral" should read --camera--.

Column 9

Line 35, "enough" should be deleted.

Signed and Sealed this

Seventeenth Day of April, 2001

Attest:

NICHOLAS P. GODICI

Attesting Officer     Acting Director of the United States Patent and Trademark Office